United States Patent [19]

Wong

[11] 4,311,741
[45] Jan. 19, 1982

[54] POLYESTER FILMS WITH IMPROVED PROCESSABILITY AND TEAR RESISTANCE

[75] Inventor: Andrew H. Wong, St. Paul, Minn.

[73] Assignee: Minnesota Mining and Manufacturing Company, St. Paul, Minn.

[21] Appl. No.: 151,415

[22] Filed: May 19, 1980

Related U.S. Application Data

[62] Division of Ser. No. 891,599, Mar. 30, 1978, Pat. No. 4,286,011.

[51] Int. Cl.$^3$ .................. B65D 41/02; B65D 41/32; B32B 27/36
[52] U.S. Cl. ...................................... 428/35; 428/335; 428/336; 428/339; 428/355; 428/480; 428/910; 220/260; 220/359
[58] Field of Search .................. 264/289; 428/35, 480, 428/910, 36, 215, 355, 212, 220, 335, 336, 339; 525/444; 220/260, 359

[56] References Cited

U.S. PATENT DOCUMENTS

| | | | |
|---|---|---|---|
| 2,465,319 | 3/1949 | Whinfield | 528/275 |
| 2,876,067 | 3/1959 | Nagel | 428/910 |
| 3,187,075 | 6/1965 | Seifried | 264/289 |
| 3,256,379 | 6/1966 | Heffelfinger | 264/289 |
| 3,423,281 | 1/1969 | Wiever | 428/480 |
| 3,446,886 | 5/1969 | Karickoff | 264/289 |
| 3,455,720 | 7/1969 | Davies | 428/910 |
| 3,679,435 | 7/1972 | Klenk | 428/36 |
| 3,728,212 | 4/1973 | Caldwell | 428/355 |
| 3,883,611 | 5/1975 | Nelson | 260/DIG. 24 |
| 3,903,042 | 9/1975 | Gall | 260/40 R |
| 3,953,394 | 4/1976 | Fox | 260/40 R |
| 3,990,603 | 11/1976 | Brochman | 220/260 |
| 4,009,312 | 2/1977 | Hayashi | 428/213 |
| 4,041,206 | 8/1977 | Tsunashima | 428/409 |
| 4,064,098 | 12/1977 | Saitoh | 525/444 |

FOREIGN PATENT DOCUMENTS 2460394 6/1976 Fed. Rep. of Germany .
2602032 8/1976 Fed. Rep. of Germany .

*Primary Examiner*—Ellis P. Robinson
*Attorney, Agent, or Firm*—Cruzan Alexander; Donald M. Sell; David R. Cleveland

[57] ABSTRACT

Polyester films consisting of a homogeneous fused, intimate mixture of polyethylene terephthalate (PET) with sufficient polytetramethylene terephthalate (PTMT) to increase film tear strength in excess of 10%. Mixed PET and PTMT resins are extruded and used to produce unoriented, uniaxially oriented, and biaxially oriented polyester films with significantly increased tear strengths. Increased tear strengths are exhibited at different PET-PTMT weight ratios depending upon the orientation of the film.

2 Claims, No Drawings

POLYESTER FILMS WITH IMPROVED PROCESSABILITY AND TEAR RESISTANCE

This is a division of Ser. No. 891,599 filed Mar. 30, 1978 now U.S. Pat. No. 4,286,011.

BACKGROUND OF THE INVENTION

This invention relates to a tougher and more tear resistant polyester film. More particularly, it relates to an exterior backing member for a tape-based easy opening can closure system.

Aesthetic and environmental considerations have recently motivated the development of beverage container closure systems which can be easily opened and which do not generate non-biodegradable container portions, e.g., ring-pull tops, that can be carelessly discarded into the environment. One solution to this problem is that disclosed in U.S. Pat. No. 3,990,603 (Brochman) incorporated herein by reference. Brochman employs an exterior tape and an interior sheet situated externally and interiorly (respectively) circumjacent a preformed opening (i.e., the pour hole) in the end portion of a beverage container, the exterior tape and interior sheet adhering to each other in the area of the preformed opening. In the opening operation, removal of the exterior film pulls the interior sheet material through the preformed opening in the beverage container shearing the interior sheet along the edges of the preformed opening, thereby giving access to the contents. Brochman discloses the parameters that must be met by the exterior tape and interior film in order to suitably contain a carbonated beverage under the conditions encountered in canning and in the ultimate consumption of carbonated beverages by the consumer.

The exterior tape in a two tape container closure system comprises a backing member on which is firmly anchored an adhesive layer. Conventional polyester films, e.g., polyethylene terephthalate (PET) have been found suitable as exterior tape backing members where containment of carbonated beverages is desired. However, in some applications it was preferable to employ a coextruded backing member, e.g., a PET layer coextruded with a copolyester comprising the reaction product of ethylene glycol and 80% terephthalate - 20% isophthalate, and adhesive primers, e.g., polycarbodiimides, to prevent delamination of the adhesive from the PET backing member. In other applications, straight PET films demonstrated inadequate tear strength or toughness. Polytetramethylene terephthalate or polybutylene terephthalate (unless the context indicates otherwise, only the 1,4 isomer is intended) films were found to have advantageous tear strength and toughness. However, PTMT resins are relatively expensive and were found difficult to process due to their rapid rates of crystallization after extrusion.

THE PRESENT INVENTION

In accordance with the present invention, a surprising synergistic increase in tear strength has been discovered in films processed from a homogeneous mixture of polyethylene terephthalate (PET) and polytetramethylene terephthalate (PTMT) resins. The PET/PTMT films of the present invention, in addition to having unexpectedly superior tear strength, do not exhibit the undesirable rapid crystallization characteristics of pure PTMT films. The present novel films do not require an additional coextruded layer to obtain very desirable adhesive receptivity.

Preferably, in one aspect, the present invention provides a tear resistant, advantageously processable polyester film comprising a homogeneous mixture of polyethylene terephthalate resin and sufficient polytetramethylene terephthalate so as to significantly increase the tear strength of the film. The polyester films described may be unoriented, uniaxially oriented and biaxially oriented. In a further aspect, an improved backing member for an external tape in a two tape, easy open container closure system is disclosed. In yet another aspect a tougher backing member for a pressure sensitive adhesive tape is described.

The novel films of the present invention comprise a homogeneous intimate mixture of PET and PTMT resins. Representative PET resins are those prepared from dimethyl terepthalate, and ethylene glycol or from terephthalic acid and ethylene glycol by methods well known in the art. A representative PTMT resin is that commercially available from Eastman Kodak Company under the trademark "Tenite".

The use of a homogeneous mixture of polymers to produce the films of this invention rather than, e.g., a coextrusion of one layer upon the other, is particularly advantageous. First, no expensive coextrusion dies are required. All that is necessary is a conventional sheeting die suitable for extrusion of stream fused, polyester resins. Secondly, with a homogeneous film (as opposed to one that is coextruded) no possibility of delamination exists. Lastly, in contrast with coextruded films, homogeneous film flashings, trim offs, etc. are potentially recyclable thereby reducing material costs.

The films of the present invention may range widely in thickness, e.g., about 0.25 mil (6.3 micrometers) to about 20 mils (500 micrometers) and above with 0.5 mil (13 micrometers) to 5 mil (130 micrometers) being preferred. The film thickness chosen will be determined by economics, the desired properties of the film (e.g., transparency, "feel", rigidity, tensile strength, etc.) and how the film is to be further processed, (e.g., uniaxial or biaxial orientation, heat-set, etc.). Where a film is to be used as a backing member for an exterior tape in an easy opening two tape can closure system, a thickness of about 2 mil (50 micrometers) to about 5 mil (130 micrometers) is preferred.

A preferred method of producing the present films is by means of extrusion of an intimate mixture of PET/PTMT resins. In this technique, controlled amounts of the respective PET and PTMT resins are mixed and fed into an extruder, to be extruded at a temperature above the softening temperature of the highest melting component, e.g., 250° C. (It has been found that some amount, e.g., less than about 5%, of ester interchange occurs under the extrusion conditions herein disclosed. Such ester interchange was not found to significantly change the properties of the films of the present invention). The intrinsic viscosity of the resins employed to produce the films of this invention is not critical and may range from about 0.5 to about 0.8 for the PET resin and from 0.9 to 1.2 for the PTMT resin. The resins are then mixed and extruded as a homogeneous fused, resin blend. Another preferred method of producing the present films, well known in the art, is extruder barrel injection. Other methods of molding a homogeneous mixture of polyester resin blends into a film will be obvious to one skilled in the art.

Typically, the preferred PET/PTMT blend is extruded at a rate of 250 pounds (115 kg) per hour from a conventional 4½ inch (11.5 cm) extruder. The amorphous unoriented film or cast web that emerges from the extruder at extrusion temperature, e.g., 275° C., is immediately cooled, e.g., by casting onto a "chilled roll" maintained at about 77° F. (25° C.) to inhibit crystallization which would make the cast web more difficult to orient. The use of a low temperature chill roll also tends to produce a high clarity, flexible film. The cooled, cast web may be further processed in some manner, e.g., coating with aluminum, or it may be immediately rolled onto a suitable carrier roll. The resulting amorphous film may be used, for example, as a wrapping material, if it is appropriately thin.

The present novel films may be stretch oriented if the cooled, cast web is warmed prior to stretching. The temperature at which the cast web may be oriented decreases from about 200° F. (93° C.) to 130° F. (54° C.) as the relative ratio of PTMT to PET is increased. The actual stretch temperature employed is a compromise between the diminishing tensilization efficiency and excessive crystallization that occurs at higher stretch temperatures and the increasing chance of web rupture or splitting that occurs as the drawability or stretchability of the web decreases at lower stretch temperatures.

As discussed above, the present novel films may be uniaxially oriented. If a uniaxially oriented film is desired, it is preferred that the axis of orientation be approximately perpendicular to the direction the web is cast. If the direction of web egress from the extruder (also the direction the web is cast) is the machine direction (MD) then the preferred direction of orientation is the transverse direction (TD) for uniaxially oriented films. TD uniaxial orientation is preferred over conventional MD uniaxial orientation because with TD orientation there is less tendency for the web to 'neck down', i.e., to become narrower, producing a web with undesirable variation in transverse, cross-sectional thickness and properties. The stretch ratio of the uniaxially oriented films of this invention is about 2:1 to 4:1 with about 2.5:1 to 3.5:1 being preferred. The preferred composition of uniaxially oriented films is about 20% by weight PTMT in PET, to about 80% by weight PTMT in PET, this preferred composition being oriented at a temperature in the range of about 135° F. (57° C.) to 145° F. (63° C.). After uniaxial orientation, the stretched film may be heat-set or heat annealed to relieve internal "strain" that would otherwise cause the film to shrink if it were subsequently heated. The heat-setting temperatures of the composition of this invention (whether after uniaxial or biaxial orientation) is in the range of 160° C. to 220° C., with 175° C. to 205° C. being preferred.

When a biaxially oriented film of the present invention is desired, it is customary for economic reasons to orient in the transverse direction after machine direction orientation. This sequence of steps is reversible and in other orientation techniques known to the art, e.g., blown film or bubble processes, it is possible that orientation along two axes may be accomplished in a single step. The transverse stretch ratios employed are preferably in the range of 2:1 to about 4:1 when the presently disclosed "flat" process biaxial orientation is employed.

The films of the present novel composition exhibit a surprising synergistic increase in tear strength as demonstrated for unoriented, uniaxially oriented, and biaxially oriented films of various compositions in Examples 1 through 8, 9 through 15, and 16 through 20, respectively.

It has been generally found that the tensile properties of unoriented, uniaxially and biaxially oriented films comprised of various weight ratios of PET and PTMT vary approximately linearly from 100% PET to 100% PTMT. Measurement of yield strength modulus and break strength (ASTM D-882 (Reapproved 1972)) reveal a roughly linear distribution of tensile property values between the 100% PET/0% PTMT film, and 0% PET/100% PTMT film end points. Therefore, it would be expected that tear test values would vary approximately linearly as the composition of the PET/PTMT film is varied from 100% polyethylene terephthalate to 100% PTMT by weight. In fact, a significant synergistic increase in tear test values is evidenced when, for example, in a uniaxially oriented film as little as 10% by weight, PTMT resin is added to a PET resin. This significant synergistic increase in tear strength (at different PET/PTMT ratios) is seen in the amorphous (unoriented), uniaxially oriented, and biaxially oriented PET/PTMT films of the present invention. (A 'significant' synergistic increase in tear strength as used herein, means a percent increase in tear strength that is greater than the experimental uncertainty in the tear strength measurement technique.)

The tear test, as modified from the Graves tear test (A.S.T.M. No. 1004) used to obtain the data from the examples, and the data contained in Tables 1, 2 and 3 respectively, was as follows:

A film specimen with a length to width ratio of about 4:1 (e.g., 4-inches (10.2 cm) to 1-inch (2.5 cm)) is excised from a polyester sheet of a given composition. The film specimen should be excised such that the longer dimension of the test sample is parallel to the desired tear direction. (If a uniaxially oriented film is to be tested then the long edge of the sample should be cut approximately perpendicular to the axis of orientation. For example, a 4-inch by 1-inch test specimen should be cut so that the 4-inch dimension is perpendicular to the axis of orientation, e.g., crosswise the long edge of a film oriented in the machine direction.) A very sharp cutting instrument, e.g. a razor blade, should be used to make a 1½ inch incision completely through the specimen on one end of the sample having legs each about ½ inch (1.27 cm) in width which may be clamped inside the top and bottom crossheads of a tensile tester, e.g., an "Instron" machine which is commercially available. The tear strength is tested at room temperature using a standard crosshead speed, e.g., 5-inches (12.7 cm) per minute. The results of such a test are reported as in Tables 1, 2, and 3 in force required to sustain a tear on a per ply basis. The experimental uncertainty in the values obtained using this tear test is about 10%.

Table 1 illustrates tear strength data for an amorphous, unoriented PET/PTMT film of this invention. It is seen that a 10% increase in tear strength is evidenced in a film having a composition of about 40% PTMT, the remainder being PET. The film tear strength then increases steeply to a maximum at 80% by weight PTMT in PET and then rapidly declines to the tear strength value of 100% PTMT. The preferred composition range of this invention for unoriented films is 40% by weight PTMT in PET to about 90% PTMT in PET.

TABLE 1

| PET/PTMT | (unoriented film) Tear test values, 3 sample average, OZ/ply | | |
|---|---|---|---|
| wt. percent | MD | TD | MD + TD |
| 100/0 | 12.7 | 16.3 | 29.0 |
| 90/10 | 12.7 | 14.3 | 27.0 |
| 80/20 | 14.0 | 16.0 | 30.0 |
| 60/40 | 17.7 | 18.7 | 36.3 |
| 40/60 | 16.7 | 21.0 | 37.7 |
| 20/80 | 27.7 | 34.3 | 62.0 |
| 10/90 | 21.7 | 26.0 | 47.7 |
| 0/100 | 14.7 | 18.7 | 33.3 |

Table 2 illustrates tear strength values obtained, as described above, for the uniaxially oriented film of this invention. The values listed are measured perpendicular to the axis of orientation. It is seen that a 10% increase in tear strength is evidenced in the range of about 10% PTMT in PET to about 90% PTMT in PET. The uniaxially oriented film is the preferred film for use as a backing member for an exterior tape in an easy open container closure system. The preferred composition for uniaxial films used as an exterior tape backing member is in the range of 20% by weight PTMT in PET to 80% by weight PTMT in PET.

Table 3 illustrates tear strength values obtained from biaxially oriented films of various compositions. A 10% increase in tear strength is evidenced at a composition of 10% PTMT in PET and continues to the composition with the greatest amount of PTMT for which tear strength values were obtained, i.e., 60% PTMT in PET. If a biaxially oriented film were used as a backing member for an external tape in an easy open container closure system, the preferred film composition range would be 10% PTMT in PET to 50% PTMT in PET.

The present novel films when used as an exterior tape backing member in an easy open closure system are advantageously used with a conformable grip tab material comprising a base layer comprising polyethylene terephthalate and an adhesion promoting layer comprising 10 to 30 percent by weight polyethylene isophthalate and correspondingly 90 to 70 percent by weight polyethylene terephthalate. This conformable grip tab material is described in a U.S. Pat. application by Wilfred R. Brochman and Andrew H. Wong entitled "Energy Absorbing Conformable Film" Ser. No. 891,600 filed Mar. 30, 1978, now U.S. Pat. No. 4,286,011. The disclosure of that application is incorporated by reference herein.

It is within the contemplation of the present invention that the surface characteristics of the present film may be altered to impart desirable properties to the film. For example, the present films may be coextruded with a compatable second resin which would impart properties such as ink receptivity or adhesive character to a surface of the film. In a coextruded film incorporating the present invention, the advantageous tear resistance of the non-coextruded films is likely to be reduced in proportion to the thickness of the film layers.

The following examples illustrate the practice of the present invention but should not be construed to limit the scope thereof. Unless otherwise noted, all percentages are by weight.

TABLE 2

| PET/PTMT | (TD Uniaxially Oriented Film) Tear test values, 4 sample average, OZ/ply* | |
|---|---|---|
| wt. percent | MD | TD |
| 100/0 | 95 | ** |
| 90/10 | 102 | ** |
| 80/20 | 111 | 4.2 |
| 60/40 | 125 | 3.8 |
| 40/60 | 121 | 4.7 |
| 20/80 | 114 | 3.0 |
| 0/100 | 81.3 | 3.9 |

*MD and TD tear values were not added due to little or no statistically significant variation in the TD tear values.
**Tear did not propagate in desired direction producing statistically unaveragable tear values.

TABLE 3

| PET/PTMT | (biaxially oriented film) Tear test values, 3 sample average, OZ/ply | | |
|---|---|---|---|
| wt. percent | MD | TD | MD + TD |
| 100/0 | 12.0 | 2.3 | 14.3 |
| 90/10 | 15.0 | 2.7 | 17.7 |
| 80/20 | 14.3 | 2.7 | 17.0 |
| 60/40 | 34.0 | 4.3 | 38.3 |
| 40/60 | 10.0 | 3.7 | 13.7 |

EXAMPLES 1–8

Three mil (75 micrometer) unoriented support films were prepared as follows:

Granular polyethylene terephthalate (PET) resin having a solution intrinsic viscosity of 0.6 and a melting point of 250° C. was blended with pelletized polytetramethylene terephthalate (PTMT) resin having a solution intrinsic viscosity of 1.0 and a melting point of 225° C. The resulting mixture of resins was fed into a 2½ inch "Prodex" extruder and extruded at a barrel temperature ranging from 250° C. to 300° C., a die temperature of 260° C. and an extrusion rate of 75 pounds (34 kg) per hour. The extruded molten film was cast onto a 12 inch (30 cm) diameter chiled roll maintained at 20° C. and rotating at a peripheral speed of 55 feet per minute. The quenched films produced in this manner had good optical clarity and a nominal thickness of 3 mils (75 micrometers).

The composition of each of the Examples was as follows:

| Example No. | COMPOSITION Wt. Percent |
|---|---|
| 1 | 100% PET resin |
| 2 | 90% PET + 10% PTMT |
| 3 | 80% PET + 20% PTMT |
| 4 | 60% PET + 40% PTMT |
| 5 | 40% PET + 60% PTMT |
| 6 | 20% PET + 80% PTMT |
| 7 | 10% PET + 90% PTMT |
| 8 | 100% PTMT resin |

The films of Examples 1–8 were evaluated according to the modified Graves tear test described above. The results of this evaluation are contained in Table 1.

EXAMPLES 9–15

Three and one-half mil (90 micrometer) uniaxially oriented support films were prepared as follows:

Granular PET and pelletized PTMT resins of the same respective solution intrinsic viscosities and melting temperatures as those in Examples 1–8 were mixed and fed into a 4½ inch (11.4 cm) "Egan" extruder, and extruded at 250 pounds (115 kg) per hour. A barrel temperature ranging from 245° C. to 285° C. and a die temperature of about 260° C. were employed. The extruded molten film was cast onto a 3 foot (0.9 m) diameter chilled roll maintained at 25° C. and rotating a peripheral speed of 45 feet (13.7 m) per minute producing a quenched film 8.75 mils (220 micrometers) in thickness of good optical clarity. The quenched film then was fed into a tenter oven where it was heated in the range of 70° C. to 85° C. and uniaxially oriented by stretching approximately 2.5× X its original width, orientation being in the transverse direction. After uniaxially transverse orientation, the oriented film was annealed by heating it briefly to 165° C. while maintaining the film under restraint.

The composition of each of six examples was as follows:

| Example No. | COMPOSITION Wt. Percent |
| --- | --- |
| 9 | 100% PET resin |
| 10 | 90% PET + 10% PTMT |
| 11 | 80% PET + 20% PTMT |
| 12 | 60% PET + 40% PTMT |
| 13 | 40% PET + 60% PTMT |
| 14 | 20% PET + 80% PTMT |
| 15 | 100% PTMT resin |

Samples of each of the above compositions were evaluated according to the modified Graves tear test discussed above, the direction of tear being approximately perpendicular to the direction of orientation. These MD tear values are illustrated in Table 2.

EXAMPLES 16–20

Two and one-half mil (64 micrometer) biaxially oriented films were prepared as follows:

Granular PET and pelletized PTMT resins of the same respective solution intrinsic viscosities and melting temperatures as those in Examples 1–8, were mixed and fed into a 2½ inch (6.35 cm) "Prodex" extruder and extruded at a rate of 160 pounds (67 kg) per hour. A barrel temperature in the range of 250° C. to 300° C. and a die temperature of 260° C. was employed. The resultant 14.5 inch (36.8 cm) wide molten web was cast onto a 12 inch (31 cm) diameter chilled roll maintained at 20° C. and rotating at a peripheral speed of about 16.5 feet (5 m) per minute. The quenched film had a nominal thickness of 11.25 mils (290 micrometers).

Next the film was oriented in the machine direction by stretching it approximately 1.5× its original MD dimension after being warmed to about 85° C. Transverse orientation of the uniaxially oriented film along a second axis approximately perpendicular to the MD was then accomplished by feeding the film into a tenter oven maintained at 70° C. to 85° C. and stretching the film to approximately three times its original width. The biaxially oriented film thus produced was annealed by heating it briefly, while under restraint, at 165° C.

The compositions of each of the runs was as follows:

| Example No. | COMPOSITION Wt. Percent |
| --- | --- |
| 16 | 100% PET resin |
| 17 | 90% PET + 10% PTMT |
| 18 | 80% PET + 20% PTMT |
| 19 | 60% PET + 40% PTMT |
| 20 | 40% PET + 60% PTMT |

Each of the above samples were subjected to the modified Graves tear test discussed above, the results of the test being contained in Table 3.

EXAMPLE 21

The uniaxially oriented, heat set film of Example 12, i.e., having a composition of 60% by weight PET and 40% by weight PTMT was treated on one side under a standard corona discharge. An adhesion promoting polycarbodiimide primer as described in U.S. Pat. No. 4,060,664 incorporated herein by reference, was then applied to the corona discharge treated side of the film. The corona discharge treated, primed polyester film was then coated with a thermoplastic block copolyester adhesive, "Dyvax PB-722" commercially available from E. I. du Pont de Nemours, Inc., to produce a thermally bondable tape.

The resulting tape was then used as an exterior tape in an easy open container closure system, it being heat-bonded onto the end of a beverage container, covering the preformed pour hole. In the area of the pour hole the exterior tape was also aggressively, thermally bonded to an interior sheet material which was bonded to the interior portion of the container circumjacent the pour hole. In use, removal of the exterior tape pulls the tears the interior sheet material to which it is bonded through the pour hole, thereby giving access to the contents of the container.

EXAMPLE 22

The uniaxially oriented, heat-set film made with a 60% PET and 40% PTMT resin mixture as described in Example 12 was coated on one side with a pressure sensitive adhesive (PSA) consisting of 100 parts natural rubber and 75 parts polyterpene tackifying resin (20% solid in heptane). The other side of the film was coated with a polyurethane release agent. The coated film was wound into a roll and functioned as an excellent pressure sensitive adhesive tape with good tear resistance.

What is claimed is:

1. A uniaxially oriented, heat set polyester film which comprises a flexible backing member of an adhesive tape, said film comprising the extrusion product of a homogeneous mixture of polyethylene terephthalate resin, and polytetramethylene terephthalate resin, wherein said film comprises 20 to 80 percent by weight polyethylene terephthalate, the remainder of said film comprising polytetramethylene terephthalate, said uniaxial orientation is accomplished by elongating said film along an axis in the range of 2.5× to 3.5×, heat setting is accomplished at in the range of 175° C. to 205° C., and wherein said film has a thickness in the range of 12.5 micrometers to 130 micrometers, said adhesive tape being circumjacent the preformed opening in a container end portion, wherein the axis along which said film is oriented is essentially parallel to the direction of pull for removing an external tape covering preformed opening in the end of a container.

2. A backing member of claim 1 wherein said container is adapted to contain pressurized beverages.

* * * * *